US010962005B2

(12) United States Patent
Hochstetler et al.

(10) Patent No.: US 10,962,005 B2
(45) Date of Patent: Mar. 30, 2021

(54) PUMP SLEEVE FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 532 days.

(21) Appl. No.: 15/808,942

(22) Filed: Nov. 10, 2017

(65) Prior Publication Data
US 2019/0145410 A1 May 16, 2019

(51) Int. Cl.
F04B 53/16 (2006.01)
F04C 15/06 (2006.01)
F04C 15/00 (2006.01)
H02K 7/18 (2006.01)
H02K 7/116 (2006.01)
F04C 2/00 (2006.01)
F02C 7/32 (2006.01)
F04C 2/344 (2006.01)
F01C 21/00 (2006.01)
F01C 21/10 (2006.01)
F01D 15/12 (2006.01)

(52) U.S. Cl.
CPC ............ F04C 15/06 (2013.01); F01C 21/007 (2013.01); F01C 21/106 (2013.01); F02C 7/32 (2013.01); F04B 53/16 (2013.01); F04C 2/00 (2013.01); F04C 2/3442 (2013.01); F04C 15/0061 (2013.01); H02K 7/116 (2013.01); H02K 7/1823 (2013.01); F01D 15/12 (2013.01); F04C 2230/85 (2013.01); F04C 2240/30 (2013.01); F05D 2220/76 (2013.01)

(58) Field of Classification Search
CPC .......... F04C 15/06; F04C 2/00; F04C 2/3442; F04C 15/0061; F04C 2230/85; F04C 2240/30; F02C 7/32; F01C 21/007; F01C 21/106; F04B 53/16; H02K 7/1823; H02K 7/116; F01D 15/12; F05D 2220/76
See application file for complete search history.

(56) References Cited

U.S. PATENT DOCUMENTS

2006/0045782 A1 3/2006 Kretzinger et al.
2007/0269322 A1 11/2007 Falk et al.
2017/0067460 A1 3/2017 Wojcik et al.

OTHER PUBLICATIONS

European Search Report for EP Application No. 18205009.6 dated Mar. 8, 2019.

Primary Examiner — Jun S Yoo
(74) Attorney, Agent, or Firm — Carlson, Gaskey & Olds, P.C.

(57) ABSTRACT

A pump sleeve for an inversion pump in an integrated drive generator has a pump sleeve body extending between a first end and a second end, the first end being at a location adjacent an enlarged endplate. The body extends to the second end with a generally cylindrical body portion having a bore of an inner diameter from the first end to the second end, and between the first and second ends for a distance. A ratio of the first distance to the inner diameter being is 1.8 and 2.0. In addition, an integrated drive generator is disclosed as is a method of replacing an accessory drive gear in an integrated drive generator.

1 Claim, 4 Drawing Sheets

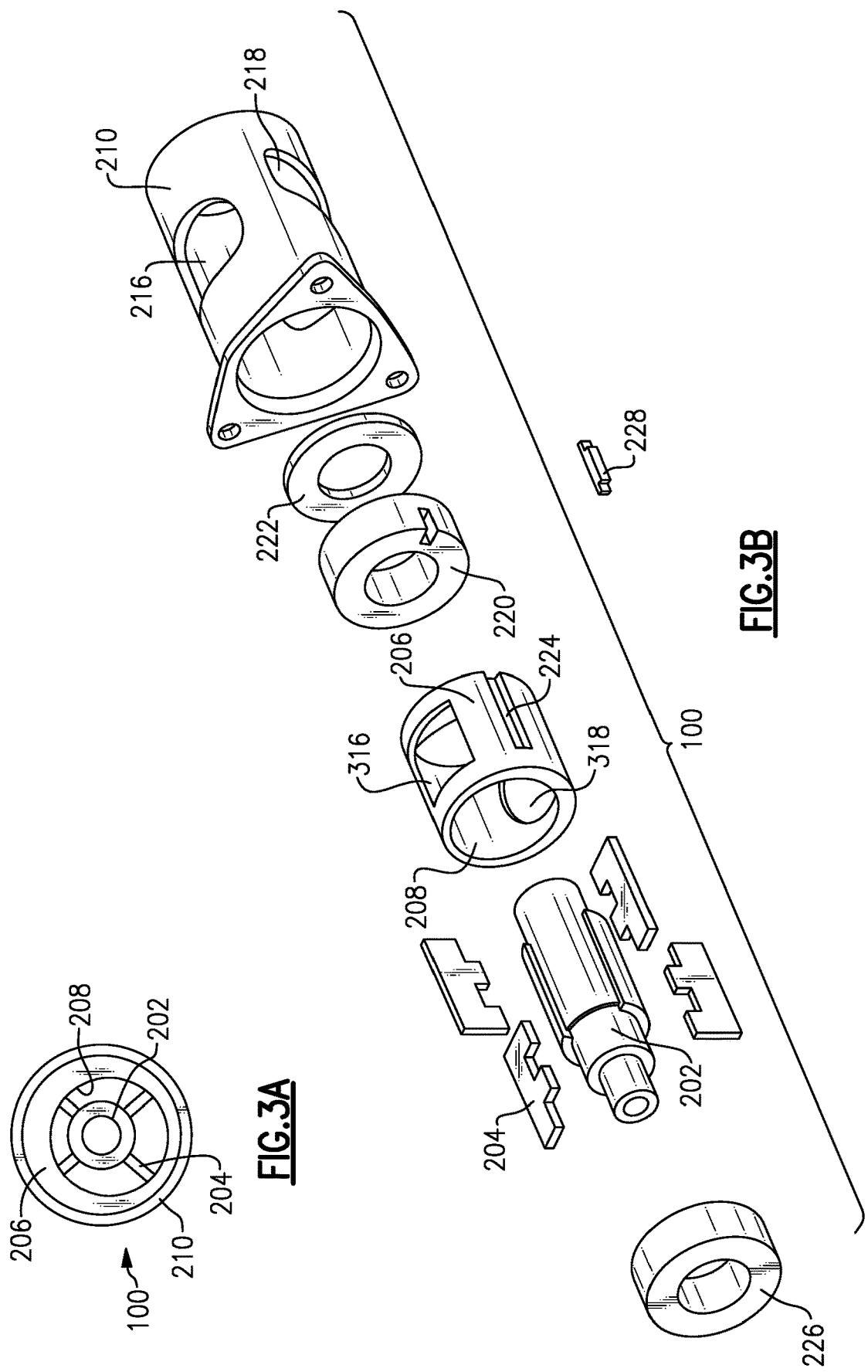

PUMP SLEEVE FOR INTEGRATED DRIVE GENERATOR

BACKGROUND

This application relates to a pump sleeve for an inversion pump for use in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

In addition, various accessory systems, such as various pumps, are driven by differential output ring gear through an accessory drive gear.

One of the pumps is an inversion pump and a pump sleeve for the inversion pump raises design challenges.

SUMMARY

A pump sleeve for an inversion pump in an integrated drive generator has a pump sleeve body extending between a first end and a second end, the first end being at a location adjacent an enlarged endplate. The body extends to the second end with a generally cylindrical body portion having a bore of an inner diameter from the first end to the second end, and extending between the first and second ends for a distance. A ratio of the first distance to the inner diameter is between 1.8 and 2.0.

In addition, an integrated drive generator is disclosed as is a method of replacing an accessory drive gear in an integrated drive generator.

These and other features may be best understood from the following drawings and specification.

BRIEF DESCRIPTION OF THE DRAWINGS

FIG. 3A shows an inversion pump.
FIG. 3B is an exploded view of the FIG. 3A inversion pump.

DETAILED DESCRIPTION

Figure 1:
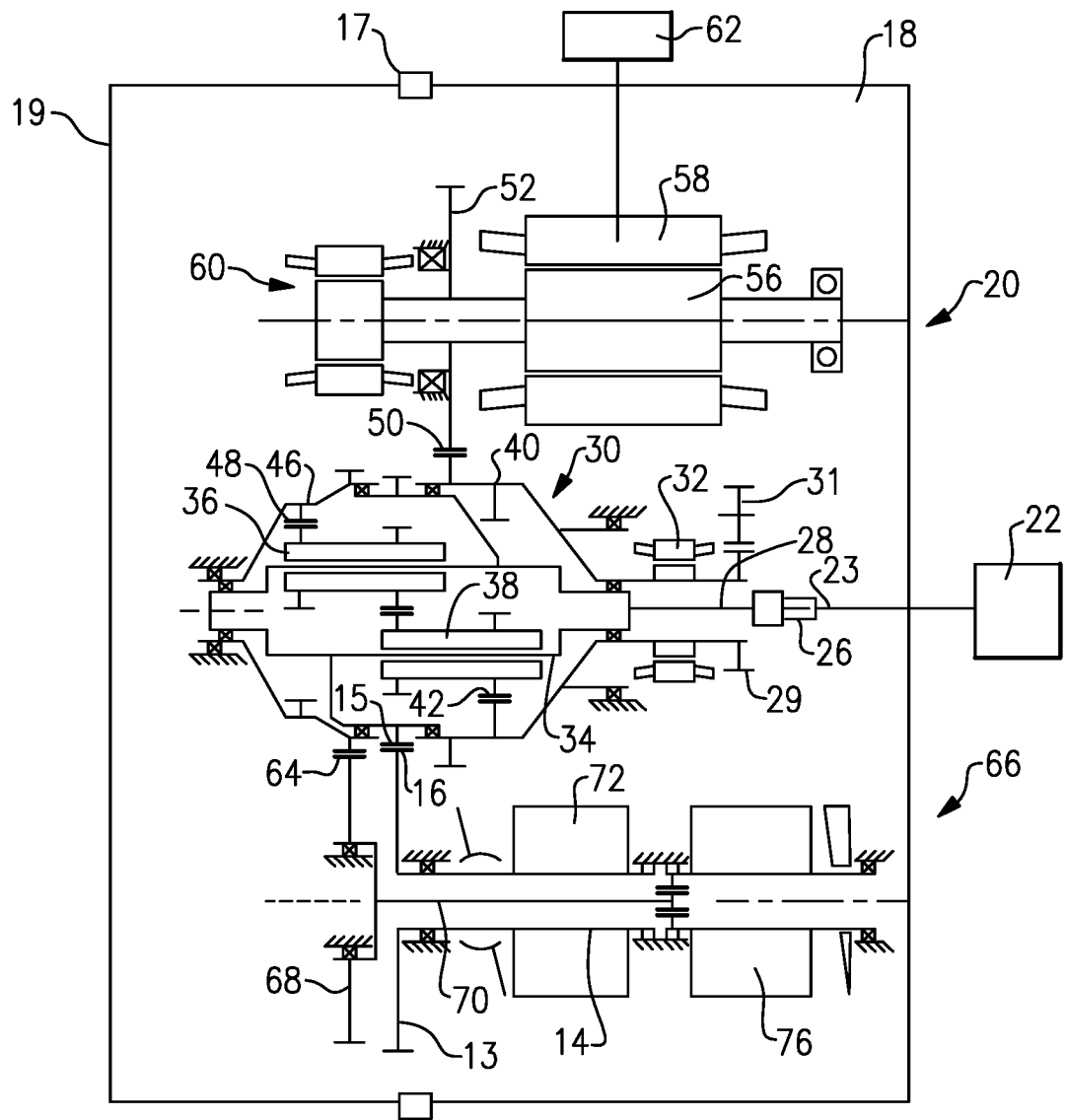
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
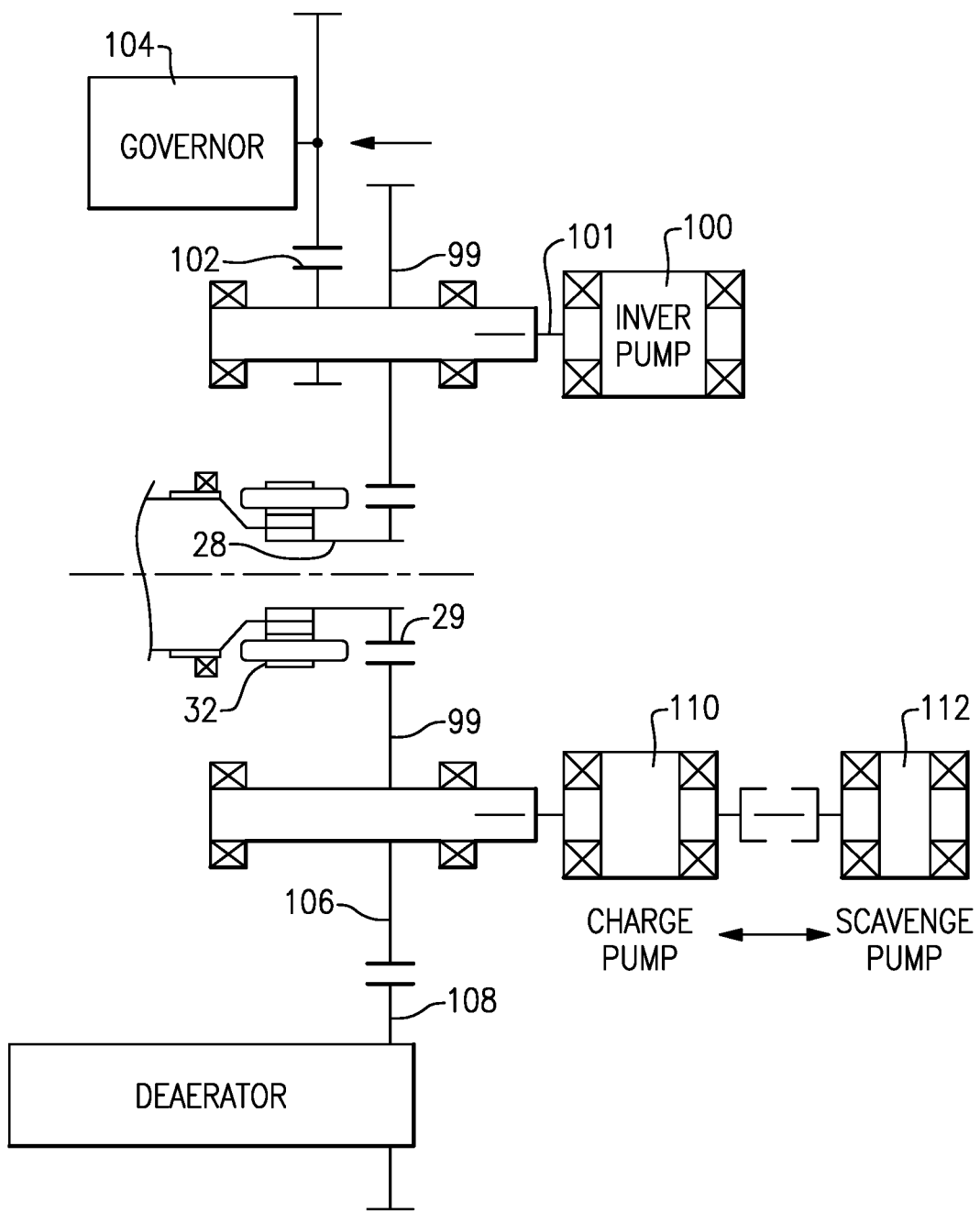
FIG. 2 shows an accessory gear drivetrain.

FIG. 2 shows the accessory drive gear 29. The accessory drive gear 29 drives a pair of driven gears 99. These driven gears were shown schematically as gear 31 in FIG. 1. One gear 99 drives a second gear 102 which, in turn, drives a governor 104. The gear 99 also drives an inversion pump 100 through a shaft 101. The second gear 99 drives a deaerator through gear 108, as well as a charge pump 110 and a scavenge pump 112.

The inversion pump 100 is illustrated in FIG. 3A. A pump shaft 202 is driven by gear 99, and carries a plurality of vanes 204. The vanes rotate within a cam 206 having an inner cam surface 208. An outer pump sleeve 210 is also illustrated.

As shown in the exploded view of FIG. 3B, the pump 100 includes the pump shaft 202, the vanes 204, the cam 206 and the sleeve 210. As can be seen, the sleeve 210 has opposed windows 216 and 218 which provide inlet and outlet ports into the pump 200. The cam 206 has mating windows 316 and 318. Bearings 220 and 226 are positioned at each end of the cam.

A plurality of Belleville spring washers, 222, provides a bias force. As shown, the cam 206 includes a keyway 224 and the sleeve 210 includes a mating keyway 240 (not shown). The key 228 locks the two together to prevent rotation.

Figure 4A:
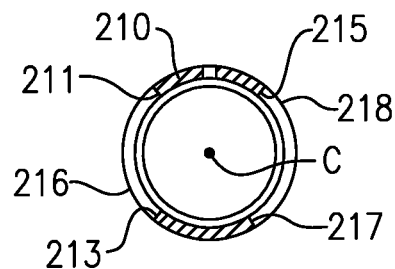
FIG. 4A is a first view of a pump sleeve.

The pump sleeve 210 is illustrated in FIG. 4A. The windows 216 and 218 are shown. Window 216 extends between circumferential ends 211 and 213. In one embodiment, the window extended for 100 degrees. In embodiments, the window 212 may extend over between 90 and 110 degrees.

The window 214 extends between ends 215 and 217. In one embodiment, the window extended for 109 degrees. In embodiments, the window may extend between 99 and 119 degrees.

Figure 4B:
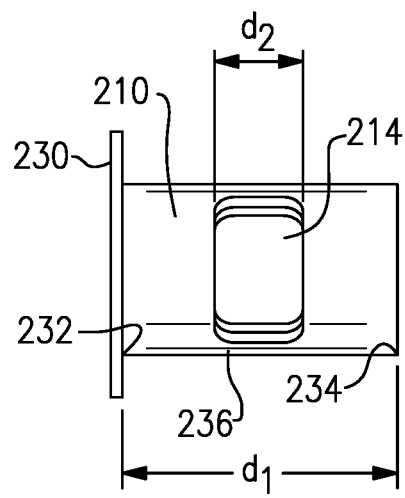
FIG. 4B is a second view of a pump sleeve.

FIG. 4B shows another view of the pump sleeve 210. An enlarged endplate 230 is formed at one end. A cylindrical portion 236 extends from an end 232 immediately after, or adjacent the endplate 230 to the end 234. The cylindrical portion 236 extends for a distance $d_1$ between first and second ends 232 and 234. The windows 216 and 218 are shown to extend for an axial distance $d_2$ measured parallel to central axis C of the sleeve.

Figure 4C:
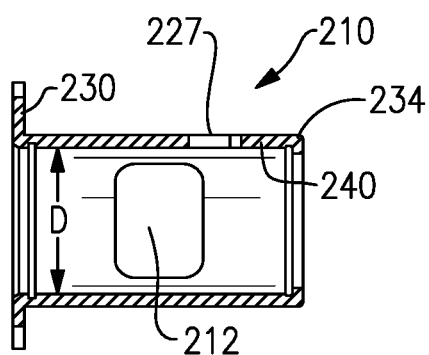
FIG. 4C is a third view of the pump sleeve.

In one embodiment, a diameter D is an inner diameter of a bore 240 as can be seen in FIG. 4C.

The distance $d_1$, in one embodiment, was 2.605 inches (6.617 centimeters). The distance $d_2$, in one embodiment, was 0.832 inch (2.113 centimeters). The diameter, in one embodiment, was 1.3754 inches (3.493 centimeters). These dimensions can be taken as being within +/−0.010 inch (0.025 cm).

The keyway slot 227 is also shown in FIG. 4C spaced towards said second end 234 relative to windows 216 and 218. Keyway 227 is circumferentially intermediate windows 216/218.

In embodiments, a ratio of the distance d2 to the diameter D is between 0.5 and 0.7. A ratio of the distance $d_1$ to D is between 1.8 and 2.0. A ratio of $d_2$ to $d_1$ is between 0.25 and 0.39.

A method of replacing a pump sleeve for an inversion pump in an integrated drive generator includes the steps of removing an existing pump sleeve from an inversion pump in an integrated drive generator. The integrated drive generator has an input shaft and a gear differential including a carrier shaft to be driven by the input shaft and a ring gear for driving a generator. The ring gear is also connected to drive an accessory drive gear. The accessory drive gear is connected to drive at least the inversion pump, which includes a driven shaft driven by the accessory drive gear, a plurality of vanes, a cam and the existing pump sleeve. The existing pump sleeve is replaced with a replacement pump sleeve including a pump sleeve body extending between a first end and a second end, the first end being at a location adjacent an enlarged endplate. The body extends to the second end with a generally cylindrical body portion having a bore with an inner diameter from the first end to the second end, and extends between the first and second ends for a distance. A ratio of the first distance to the inner diameter being between 1.8 and 2.0.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A pump sleeve for an inversion pump in an integrated drive generator comprising:
a pump sleeve body extending between a first end and a second end, said first end being at a location adjacent an enlarged endplate, and said body extending to said second end with a generally cylindrical body portion having a bore of an inner diameter from said first end to said second end, and extending between said first and second ends for a first distance, and a ratio of said first distance to said inner diameter being between 1.8 and 2.0;
wherein said pump sleeve having two circumferentially spaced windows to provide fluid ports, and each of said windows extending for a second distance measured parallel to a central axis of said cylindrical portion, and a ratio of said second distance to said inner diameter being between 0.5 and 0.7;
wherein a ratio of said second distance to said first distance being between 0.25 and 0.39; and
wherein said windows extend between two circumferential ends and one of said windows extending for between 90 and 110 degrees in said circumferential distance and a second of said windows extending for between 99 and 119 degrees in said circumferential distance.

* * * * *